United States Patent [19]
Obara et al.

[11] Patent Number: 5,355,749
[45] Date of Patent: Oct. 18, 1994

[54] CONTROL APPARATUS AND CONTROL METHOD FOR MOTOR DRIVE VEHICLE

[75] Inventors: Sanshiro Obara, Ibaraki; Ryoso Masaki, Hitachi; Toshiaki Okuyama, Ibaraki; Tsutomu Ohmae, Hitachi; Keigo Naoi, Katsuta; Makoto Shioya, Tokyo, all of Japan

[73] Assignee: Hitachi, Ltd., Tokyo, Japan

[21] Appl. No.: 992,112

[22] Filed: Dec. 17, 1992

[30] Foreign Application Priority Data

Dec. 20, 1991 [JP] Japan .................. 3-338140

[51] Int. Cl.⁵ ........................... F16H 59/36
[52] U.S. Cl. ......................... 477/20; 477/15
[58] Field of Search ........................ 74/866

[56] References Cited

U.S. PATENT DOCUMENTS

| | | | |
|---|---|---|---|
| 4,458,318 | 7/1984 | Smit et al. | 74/866 |
| 4,458,560 | 7/1984 | Frank et al. | 74/866 |
| 4,459,878 | 7/1984 | Frank | 74/866 |
| 4,507,986 | 4/1985 | Okamura et al. | 74/866 |
| 4,509,125 | 4/1985 | Fattic et al. | 74/866 |
| 4,515,040 | 5/1985 | Takeuchi et al. | 74/866 |
| 4,515,041 | 5/1985 | Frank et al. | 74/866 |
| 4,546,673 | 10/1985 | Shigematsu et al. | 74/866 |
| 4,649,488 | 3/1987 | Osanai et al. | 74/866 |
| 4,653,006 | 3/1987 | Osanai et al. | 74/866 |
| 4,715,258 | 12/1987 | Shigematsu et al. | 74/866 |
| 4,720,793 | 1/1988 | Watanabe et al. | . |
| 4,730,518 | 4/1988 | Miyawaki | . |
| 4,735,114 | 4/1988 | Satoh et al. | . |
| 4,852,429 | 8/1989 | Kunzer et al. | . |
| 4,872,115 | 10/1989 | Itoh et al. | . |
| 4,926,716 | 5/1990 | Hirano et al. | 74/866 |
| 5,047,937 | 9/1991 | Vahabzadeh et al. | 74/866 |
| 5,050,455 | 9/1991 | Yamashita et al. | 74/866 |

FOREIGN PATENT DOCUMENTS 58-160661 9/1983 Japan .
59-226747 12/1984 Japan .
3-128789 5/1991 Japan .
3-91001 9/1991 Japan .

OTHER PUBLICATIONS

DE-Z: Gutberlet, Heinrich: "Einfach-Elektro-Antriebe mit nachgeschaltetem Getriebe" in: etz-a 98 (1977), issue 1, pp. 32–37.

Primary Examiner—Dirk Wright
Attorney, Agent, or Firm—Evenson, McKeown, Edwards & Lenahan

[57] ABSTRACT

A control apparatus of a motor drive vehicle includes a unit for generating a target vehicle speed; a speed instruction unit for generating a target motor rotational speed of the motor based upon a preset motor control pattern in response to the target vehicle speed; a power circuit for operating the motor at the target motor rotational speed upon receipt of the target motor rotational speed; a variable transmission unit for converting a drive output from the motor into a transmission ratio for instructing a rotational speed of the drive output, and transferring the converted transmission ratio to a drive shaft of the motor drive vehicle; and a transmission ratio calculating unit for determining the transmission gear ratio based on the target vehicle speed and the target motor rotational speed thereby to instruct the determined transmission gear ratio to the variable transmission unit. A control method sets a target vehicle speed value; produces a target motor rotational speed based upon the target vehicle speed value and a preset motor control pattern; operates the motor at the target motor rotational speed; determines a transmission gear ratio based upon both of the target vehicle speed and the target motor rotational speed; and converts a rotational speed of a drive output into the transmission ratio and transfers the converted transmission ratio to a drive shaft.

13 Claims, 6 Drawing Sheets

CONTROL APPARATUS AND CONTROL METHOD FOR MOTOR DRIVE VEHICLE

BACKGROUND OF THE INVENTION

The present invention relates to a control apparatus and a control method for a motor drive vehicle in which a motor is employed as a power source.

Motor drive vehicles have been proposed as useful transportation means capable of substituting for an automobile with an internal combustion engine functioning as a power source, namely as a non-pollutional vehicle capable of meeting a requirement for a global worldwide environment protection.

In accordance with the very recent technology, a maximum speed and also an acceleration performance of such a motor drive vehicle closely resemble those of the normal gasoline motorcar. There are two typical motor drive vehicles, namely, one vehicle equipped with a solar cell functioning as a power source thereof and the other vehicle equipped with battery as this power source.

A motor drive vehicle has such superior merits that neither automotive exhaust gas, nor carbon dioxide is emitted and, however, has such problems that a drivable distance achieved by a single or 1-recharging operation of a battery is still shorter than that of a gasoline motorcar up to now. To extend the drive distance achieved by the 1-recharging operation of the battery, energy density of this battery must be increased as well as the efficiencies of the constructive elements of the drive apparatus employed in the motor drive vehicle must be also increased.

With the very recent technology, a driving apparatus system employed in a motor drive vehicle is arranged by a battery, an inverter, a motor, a transmission and a wheel. As the inverter, a bridge type PWM (pulse width modulation) inverter constructed of a highspeed switching element (IGBT power transistor) is utilized. As the motor, either an induction motor vectorcontrolled by such a bridge type PWM inverter, or a synchronous motor with employment of a permanent magnet is used. Further, either a transmission system with three or more stages, or fixed gear ratios is employed.

Since a motor drive vehicle is driven under various road conditions and running conditions, the vehicle must run throughout the wide load range. Accordingly, there are many possibilities that a single motor can not cover such wide load range. Thus, a transmission system is normally utilized, the same as in an internal combustion engine. A motor drive vehicle equipped with a transmission system is known from, for instance, Japanese publications of JP-A-3-128789 and JU-A-3-91001.

The first publication of JP-A-3-128789 filed on Jun. 20, 1990 in Japan discloses the motorcycle with the motor as the power source. This motorcycle employs the automatic centrifugal clutch and is operated in such a manner that when the rotational speed of the motor has reached a certain speed range, either the clutch or the automatic transmission system is automatically coupled with the motor output and the drive shaft.

On the other hand, in JU-A-3-91001 filed on Dec. 27, 1989 in Japan, there is described the drive control apparatus for the motor drive vehicle in which when the motor current reaches a preset limit value, the transmission ratio of the no-stage transmission system is varied.

Furthermore, two Japanese patent publications under numbers of JP-A-58-160661 (filed on Mar. 17, 1982) and JP-A-59-226747 (filed on Jun. 3, 1983) have been opened, although these patents relate not to the motor drive vehicle, but to the gasoline engine automobile equipped with CVT ( continuously variable transmission). More specifically, these patent applications disclose the control apparatus used in such a gasoline engine automobile with the CVT, in which the transmission ratio of the CVT is controlled while driving the gasoline engine at the minimum fuel consumption ratio.

SUMMARY OF THE INVENTION

An object of the present invention is to provide a control apparatus and a control method for a motor drive vehicle, by which a driving efficiency of a driving apparatus employed in the motor drive vehicle is increased, or improved in order that a drivable distance of the motor drive vehicle achieved by a single or 1-recharging operation of a battery is extended.

According to one aspect of the present invention, a control apparatus of a motor drive vehicle comprises:
a unit for generating a target vehicle speed;
a speed instruction unit for generating a target motor rotational speed of a motor based upon a preset motor control pattern in response to the target vehicle speed;
a power circuit for operating the motor at the target motor rotational speed upon receipt of the target motor rotational speed;
a variable transmission unit for converting a drive output from the motor into a transmission gear ratio for instructing a rotational speed of the drive output, and transferring the converted transmission gear ratio to a drive shaft of the motor drive vehicle; and
a transmission gear ratio calculating unit for determining the transmission gear ratio based on the target vehicle speed and the target motor rotational speed thereby to instruct the determined transmission gear ratio to the variable transmission unit.

In accordance with another aspect of the present invention, a control method of a motor drive vehicle comprises:
a step for setting a target vehicle speed value;
a step for producing a target motor rotational speed of the motor based upon the target vehicle speed value and a preset motor control pattern;
a step for operating the motor at said target motor rotational speed;
a step for determining a transmission gear ratio based upon both of the target vehicle speed and the target motor rotational speed; and
a step for converting a rotational speed of a drive output of the motor into the transmission gear ratio and for transferring the converted transmission gear ratio to a drive shaft of the motor drive vehicle.

According to the present invention, since the speed of the motor is controlled in accordance with the preset motor drive control pattern, the motor drive vehicle can be controlled at the high response characteristics and the high efficiency. As a consequence, the drivable distance of the motor drive vehicle achieved by the 1-recharging operation of the battery can be extended. Even when the control apparatus of the present invention would be applied to such a motor drive vehicle equipped with a solar cell functioning as a power source, a driving apparatus of this motor drive vehicle could be operated at high efficiencies. As a result, since energy derived from the solar cell can be effectively utilized, a drivable distance achieved by this solar energy can be extended.

DESCRIPTION OF THE PREFERRED EMBODIMENTS

Figure 1:
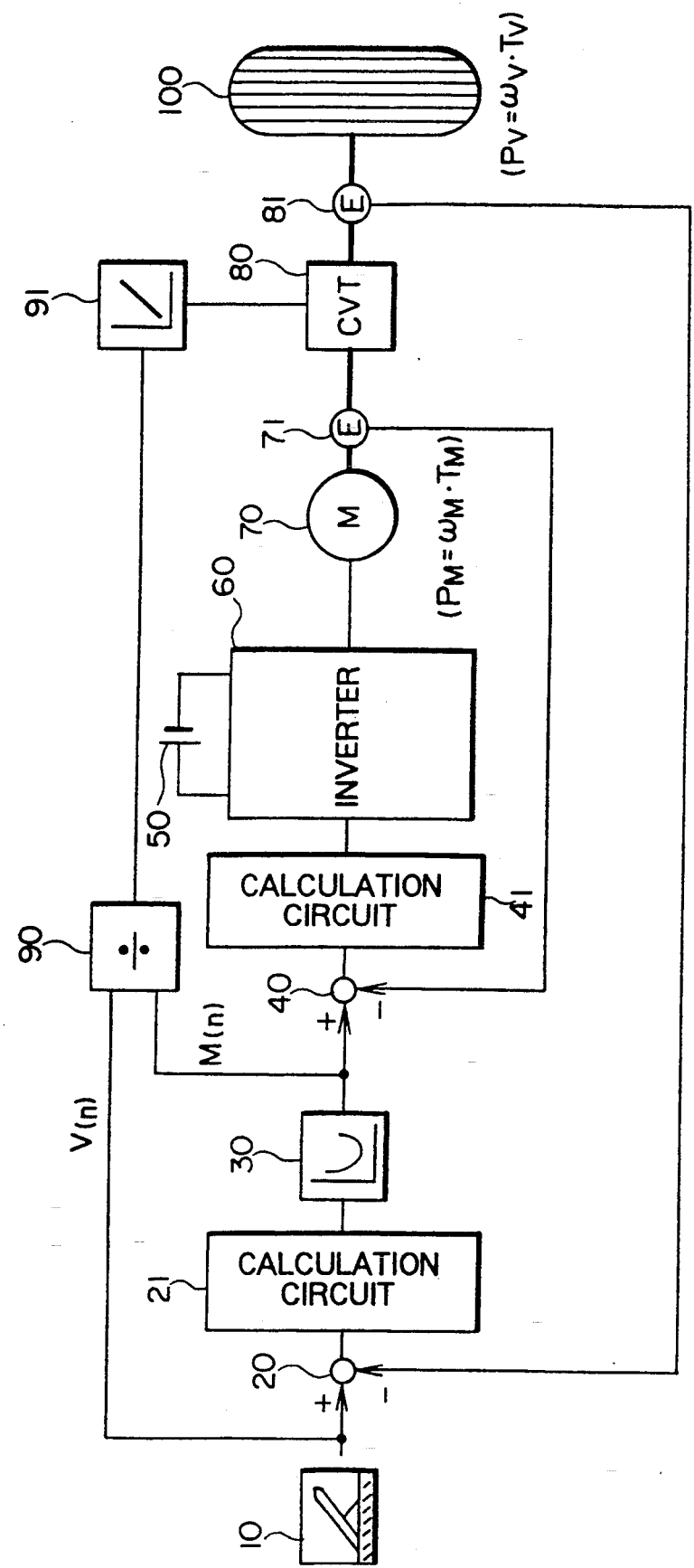
FIG. 1 is a control block diagram of a control apparatus for a motor drive vehicle according to the present invention.

Referring now to the drawings, control apparatuses and control methods for a motor drive vehicle, according to preferred embodiments of the present invention, will be described in detail.

In FIG. 1, there is shown a block diagram of a control apparatus according to one preferred embodiment of the present invention. A control system for a motor drive vehicle is briefly constructed as follows: A speed instruction is issued from an accelerator device 10. Then, an AC (alternating current) signal for driving a motor is generated by an inverter 60 and an induction motor 70 is driven by this drive AC signal. A rotational speed outputted from the induction motor 70 is varied by a continuously variable transmission (CVT) 80, and thus the varied rotational speed is transported to a wheel 100.

When the accelerator pedal of the accelerator device 10 is depressed by a vehicle driver (not shown), a target rotational speed signal for a vehicle (target vehicle speed signal) in response to a depression amount of an accelerator pedal (not shown in detail) is generated by the accelerator device 10. In an automobile where an internal combustion engine is used as drive power, a depression amount of an accelerator pedal corresponds to a torque instruction of the internal combination engine. However, in accordance with this preferred embodiment of the present invention, a rotational speed of a wheel, namely a vehicle speed is used as an instruction value to control the rotational speed.

An adder 20 outputs a deviation between the target wheel rotational speed and an actual wheel rotational speed by a rotational speed detected sensor 81. A calculation circuit produces a feedback control signal by which the deviation in the rotational speeds derived from the adder becomes small.

A unit 30 for generating a target motor rotational speed has previously stored a maximum efficiency drive pattern (will be discussed later). Upon receipt of the output signal from the calculation circuit 21, the unit 30 for generating the target motor rotational speed outputs a rotational speed of a motor under the maximum efficiency condition as the target motor rotational speed with reference to the maximum efficiency drive pattern.

The adder 40 outputs a deviation between the target motor rotational speed and an actual rotational speed of an induction motor 70 detected by a rotational speed sensor 71. The calculation circuit 41 produces such a feedback control signal that the deviation in the rotational speeds from the adder 40 becomes small.

An inverter 60 inverts a DC voltage of a battery 50 into an AC drive voltage with a sinusoidal waveform in a pulse width modulation mode, thereby applying the PW-modulated drive voltage to an induction motor 70.

A rotation output of the motor 70 is inputted into the CVT 80, so that a rotation output transformed by an instructed transmission ratio is transferred via a drive shaft to a drive wheel 100. The transmission ratio of the CVT 80 is determined by calculating a ratio of the target wheel rotational speed derived from the accelerator device 10 to the target motor rotational speed derived from the unit 30 for generating the target motor rotational speed.

There are both a DC motor and an AC motor (induction motor and synchronous motor). Generally speaking, AC motors have been widely utilized in a motor drive vehicle. A major circuit arrangement of the inverter 60 is different from each other, depending upon the type of motors. In a DC motor, a chopper control has been normally used as a power control circuit, whereas the above-described inverter is usually used as a power control circuit in an AC motor. In a motor control, a vector control has been widely employed in which the vector control is performed by an AC motor capable of independently controlling a torque component and a magnetic flux component similar to a DC motor. In the preferred embodiments of the present invention, an induction motor is employed.

As the automatic variable speed controller, i.e., an automatic variable speed transmission, corresponding to one constructive element of the present invention, there are an automatic stage transmission with employment of a planetary gear, and a non-stage transmission so-called as a "CVT" (Continuously Variable Transmission). In accordance with the present invention, a non-stage transmission is employed as the transmission in the preferred embodiments.

Figure 2:
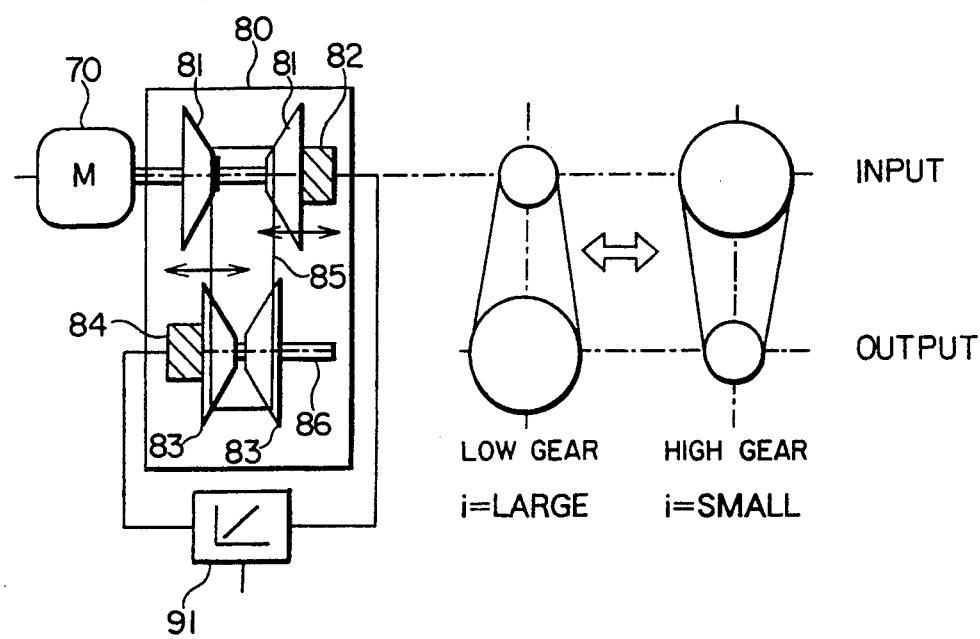
FIG. 2 is a schematic diagram for explaining a construction and an operation of a CVT (continuously variable transmission) used in the control apparatus according to the present invention.

In FIG. 2, the CVT 80 is constructed of an inputside drive pulley 81 connected to the motor 70; an outside pulley 83 connected to a wheel 100; a belt 85 (V belt, or the like) set between the inputside pulley 81 and the outputside pulley 83; and pulley drivers 82, 84 for driving these pulleys 81 and 83. Both of the pulley drivers 82 and 84 control tension of the belt 85 to be constant by way of either an oil compression drive, or an oil and spring drive, so that a transmission efficiency is increased.

Transmission Gear Ratio "i" =

$$\begin{aligned}\text{Transmission Gear Ratio "i"} &= \\ \text{outputside rotational speed/inputside} \\ \text{rotational speed} &= \\ \text{wheel rotational speed/motor} \\ \text{rotational speed.}\end{aligned} \quad (1)$$

Conditions of the belt when the transmission gear ratio becomes large or small are also shown. The transmission gear ratio of the motor 70 and the wheel 100 may be continuously controlled by controlling the pulley drivers 82 and 84 by way of a transmission gear ratio control means 91.

Figure 3:
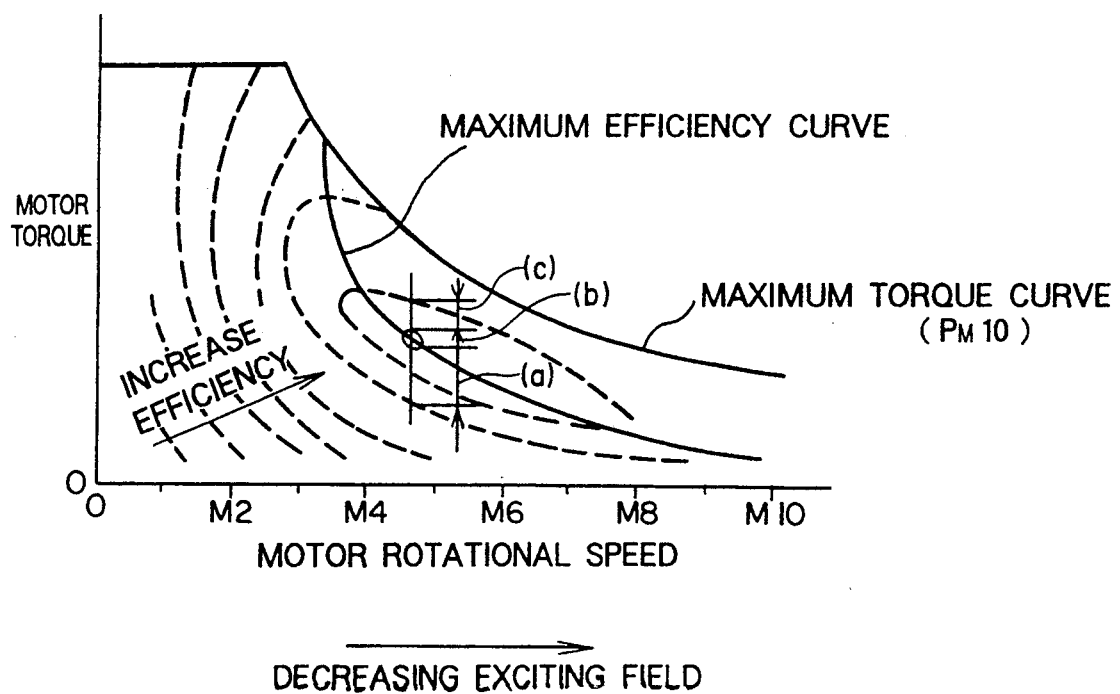
FIG. 3 represents a characteristic diagram for showing a relationship among torque, rotational speed and an efficiency of a system combining an inverter with a motor.
Figure 4:
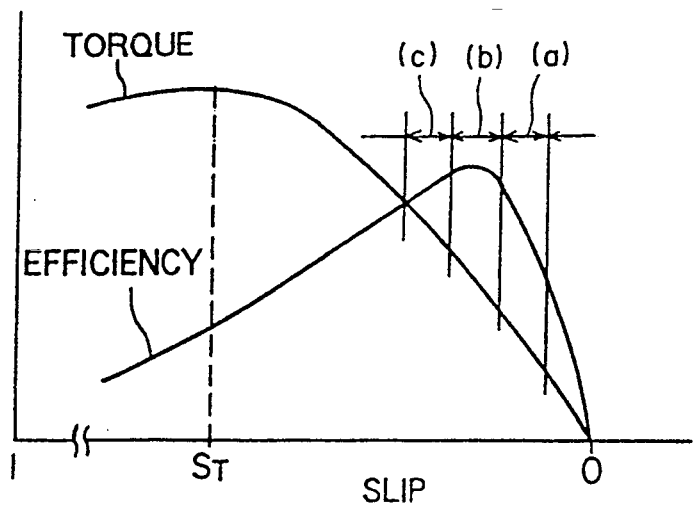
FIG. 4 is a characteristic diagram for representing torque and an efficiency with respect to a slip of the motor itself.

Operations of the control apparatus according to the present invention, involving the characteristics of the inverter 60 and the motor 70 will now be explained. In FIG. 3, there is shown a characteristic between the torque of the motor 70 and the rotational speed thereof in the system constructed by combining the inverter 60 with the motor 70. A dot line indicates an equi-efficiency curve. A combined efficiency between the inverter 60 and the motor 70 (simply referred to as "an efficiency") represents such a characteristic that the greater the torque becomes in a range from the rotational speed M4 of the motor to the rotational speed M8 thereof, this combined efficiency curve passes through a maximum efficiency point. Symbols (a), (b) and (c) indicated in a torque/efficiency characteristic of a motor itself of FIG. 4 correspond to symbols (a), (b), (c) of FIG. 3. As apparent from FIG. 4, in the motor, the efficiency has a point of inflection while the torque is monotonously decreased after a slip "ST" at which stalling torque is produced. Other factors such as a switching loss of a power switching element employed in the inverter 60 may cause the efficiency. A maximum efficiency curve at each of the motor rotational speeds, as indicated by a fat line, is obtained from this equi-efficiency curve. It should be noted that the reason why the line of the maximum torque (PM 10) becomes a constant value in a low rotational speed region, is a limit caused by the maximum current of the motor. If there is no current control at the side of the motor, the maximum torque (PM 10) would be increased with a decrease in the rotational speed.

The operations of the system shown in FIG. 1 will now be explained. Normally, torque is explained as a parameter in a relation among a prime mover (an engine or a motor), a transmission and a wheel in a vehicle. However, in the case of this preferred embodiment of the present invention, since the CVT 80 is used, variations in the transmission gear ratio of the CVT 80 may cause outputs of the motor 70, and therefore the operations will be described under such a condition that power irrelevant to the transmission ratio is introduced as a parameter. It is assumed in the following description that output power of the motor 70 is "$P_M$", and power inputted to the wheel 10 is "$P_V$". It should be noted that a power loss occurring in the drive system is neglected.

$$\begin{aligned}\text{The power } P_M \text{ of the motor 70} &= \omega_m \times T_M & (2) \\ \text{The power } P_V \text{ of the wheel 100} &= \omega_v \times T_V & (3) \\ P_M &= \eta_{cvt} \times P_V = P_V & (4)\end{aligned}$$

Although a transmission efficiency $\eta_{cvt}$ is present in the CVT 80, this transmission efficiency may be higher than 90% so that this efficiency should be negligible. In the above-described equations (2) to (4), symbol "$\omega_m$" indicates an angular velocity ($2\pi M/60$, "M" is a rotational speed) of the motor 70; symbol "$\omega_V$" denotes an angular velocity ($2\pi V/60$, "V" is a rotational speed) of the wheel 100; symbol "$T_M$" shows torque of the motor 70; and symbol "$T_V$" is torque of the wheel 100.

Assuming now that the maximum torque curve of the motor 70 in FIG. 3 is maximum power "$P_M 10$, based upon the equation (2), a maximum efficiency curve of the motor rotational speed with respect to the motor power, as indicated by a fat line, from the characteristic of the power $P_M$ of the motor 70 (simply will be referred to "$P_M$"), in which the efficiency is used as the parameter.

Figure 5:
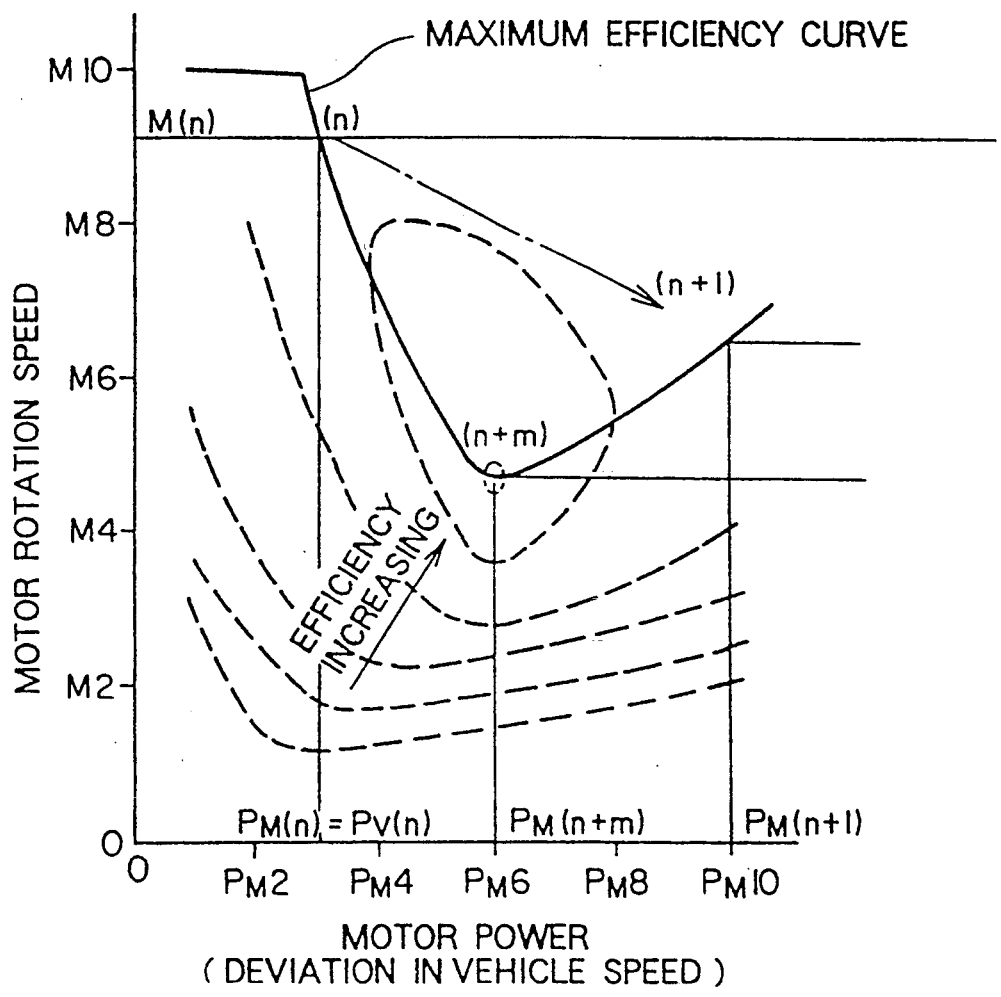
FIG. 5 is a graphic representation of a maximum efficiency curve with regard to the rotational speed of the motor and power of the motor obtained from the characteristics of FIG. 3.

The characteristic shown in FIG. 3 may be previously obtained by performing experience. When motor power (motor rotational speed X motor torque) is conducted into the characteristic of FIG. 3, relations between the motor power and the motor torque are plotted, and also the maximum efficiency points within the plotted points are traced, the maximum efficiency curve shown in FIG. 5 is obtained. The motor power indicated in an abscissa of the graphic representation shown in FIG. 5 may correspond to a value of speed deviation, namely the output of the calculation circuit 21 in the system of FIG. 1. In other words, if the speed deviation (motor power) is given, then the motor rotational speed at the maximum efficiency can be determined based upon the characteristic of FIG. 5.

This maximum efficiency curve is previously stored in the unit 30 for generating the target motor rotational speed, and then when target motor power $P_M$ (speed deviation) is outputted from the calculation circuit 21, a target motor rotational speed "M" is outputted from the maximum efficiency curve.

Figure 7:
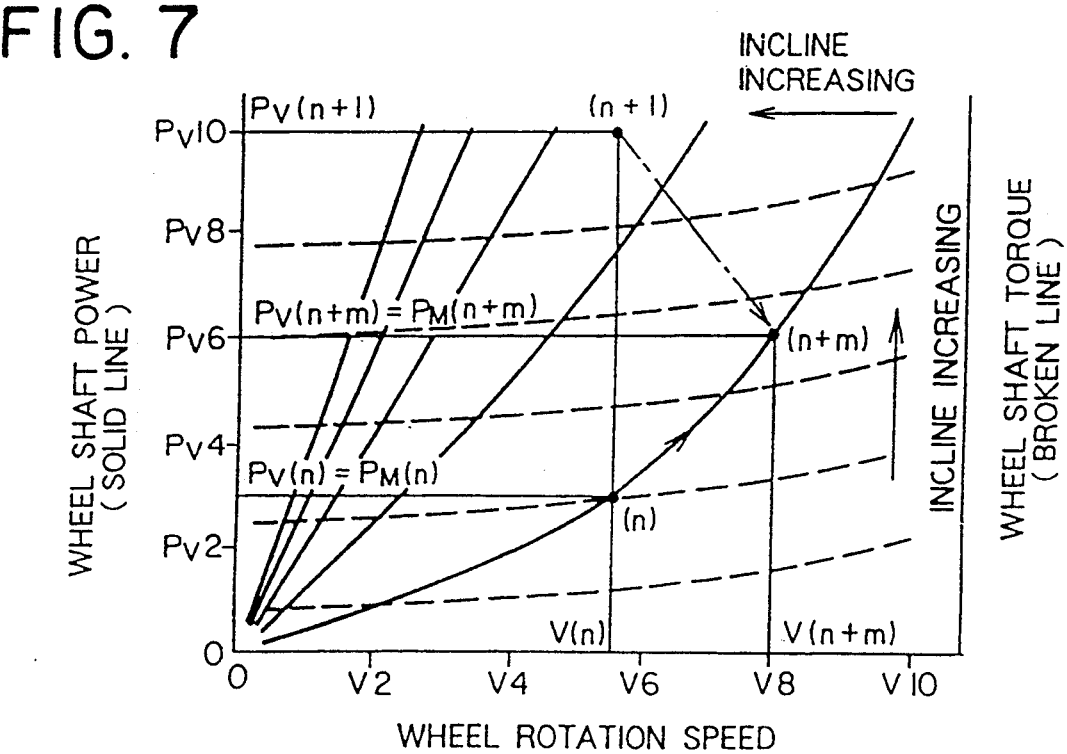
FIG. 7 graphically represents a load condition (incline etc.) at a side of a wheel by wheel shaft power and a rotational speed.

Also, based upon the equation (3), a characteristic of wheel shaft power $P_V$ (simply, will be referred to "$P_V$") indicated by a solid line of FIG. 7 is obtained from necessary shaft torque of the wheel 100 (dot line) with regard to the wheel rotational speed in which an incline of a road is used as a parameter.

Figure 6:
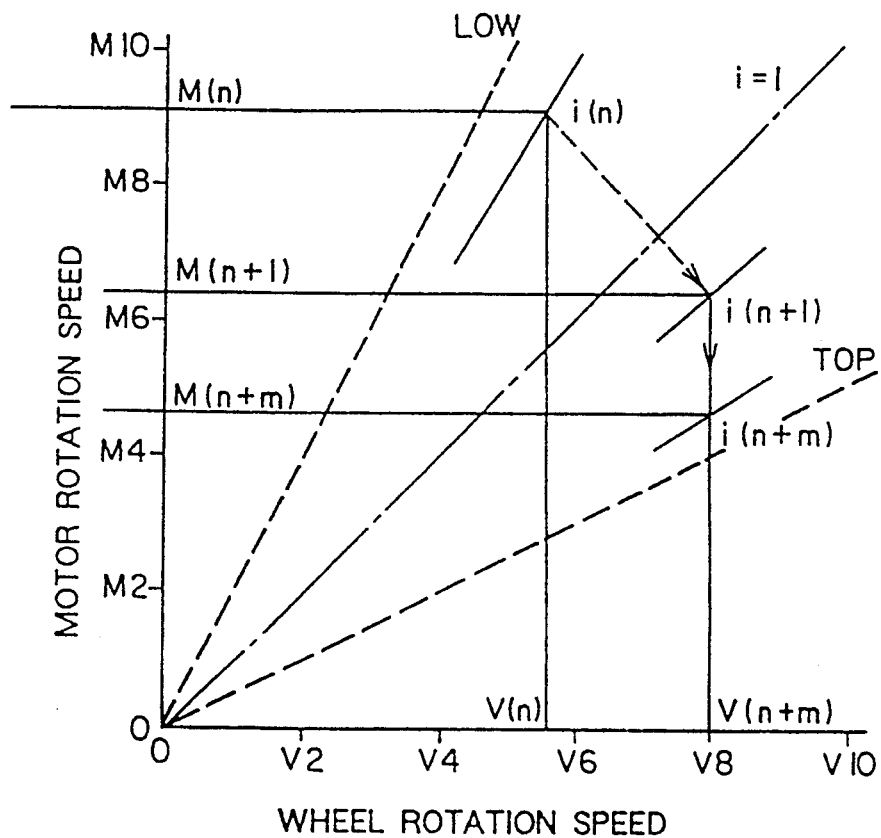
FIG. 6 indicates a transmission gear ratio between an input side (motor rotational speed) and an output side (wheel rotational speed)

FIG. 6 is a characteristic diagram for representing a transmission gear ratio of the CVT 80 with respect to the motor 70 and the rotational speed of the wheel 100. It should be noted that the rotational speed of the wheel 100 corresponds to a vehicle speed. It is now assumed that a vehicle driver drives a motor drive vehicle equipped with the characteristics as defined from FIG. 5 to FIG. 7 by actuating the accelerator 10 based on the load surface conditions and the expected vehicle speed at a time instant (n) of FIG. 7, namely under conditions of a wheel rotational speed V(n) and power $P_V(n)$. The motor 70 and the CVT 80 at this time instant are driven at the time instant (n) of FIGS. 5 and 6. That is to say, the unit 30 for generating the target motor rotational speed outputs the target rotational speed M(n) at such a time instant when the motor power power $P_M(n)$ shown in FIG. 5 is equal to the wheel shaft power $P_V(n)$, and the motor 70 is operated at this rotational speed. As indicated in FIG. 6, the CVT 80 is operated under the transmission gear ratio "i" (n) which has been obtained by the target wheel rotational speed V(n) of the accelerator 10 and the target motor rotational speed M(n) of the unit 30 for generating the target motor rotational speed via the calculation circuit 90 and the drive unit 91.

A motor speed control system arranged by the motor speed control means 40, 41, the inverter 60, the motor 70, and the speed sensor 71 has a higher speed response than that of the wheel speed control system in which the output signal of the speed sensor 81 for the wheel is used as the feedback signal. The circuit arrangement made from the unit 30 for generating the target motor rotational speed, the motor speed control system, and the adder 40 to the input of the CVT 80 is operated as one sort of motor power generation control systems.

Figure 8:
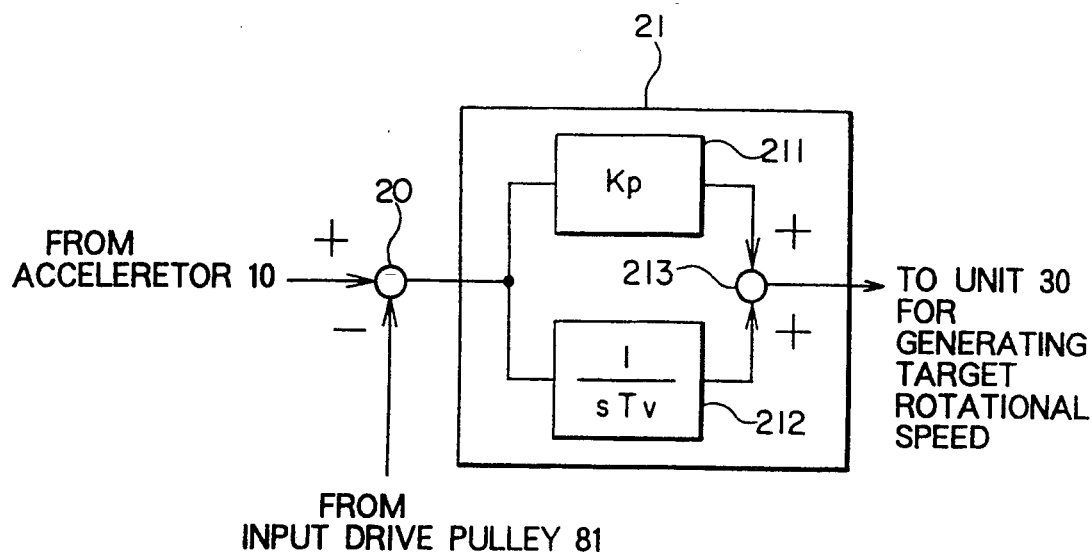
FIG. 8 is a schematic block diagram for indicating an internal unit of a wheel rotational-speed controlling unit.

A description will now be made of such a case that the calculation circuit 21 of the vehicle speed control means in FIG. 1 performs a proportional-integral compensator (PI compensator) control calculation. In FIG. 8, reference numeral 211 indicates proportional-integral compensator calculating means; symbol "$k_p$" denotes a proportional-integral compensating constant; reference numeral 212 denotes an integral compensator calculating means; symbol "s" denotes an operator; symbol "$T_V$" indicates an integral time constant; and reference numeral 213 shows an adding means.

Considering now that a vehicle driver depresses the accelerator 10 during the drive condition at the time instant (n) shown in FIG. 7, as previously described, in order to accelerate the required wheel shaft power to $P_v$ (n+m) under the same road surface condition and the time instant (n+m) of incline, namely the target wheel rotational speed V (n+m) (=VS). At the time instant (n) of FIG. 1, the output from the proportional-integral compensator calculating means becomes zero, because the control is performed that the target wheel rotational speed is equal to the actual wheel rotational speed due to the effect of the integral compensation calculating means 213.

A newly obtained output from the calculating circuit 21 at a time instant (n+1) when the accelerator 10 is depressed, becomes $P_M(n+1)$ (=$P_M10$) due to the effect of the proportional compensating constant "Kp" from $P_M$ by calculating an equation (5):

$$P_M(n+1) = Kp(V_{ref}(n+1) - V(n)) + P_M(n) = P_M10 \quad (5)$$

With regard to this $P_M10$, as indicated in FIG. 5, the unit 30 for generating the target motor rotational speed outputs a target motor speed M (n+1), and then it is so controlled that the motor 70 is operated at this rotational speed with a better response characteristic. The CVT 80 is set to such a transmission gear ratio i(n+1), as shown in FIG. 6, which is obtained by way of the calculating means 90, based upon the target wheel rotational speed "$V_{ref}$" and the target motor rotational speed M (n+1) in an equation (6):

$$V_{ref}(n+1) = V(n+m) = V8 \quad (6)$$

Under such a condition, as indicated in FIG. 7, at the time instant V(n), the vehicle is accelerated by residual axial power of a difference between $P_v(n+1)$ and $P_v(n)$.

Thereafter, in the control system shown in FIG. 1, the respective values are operated along arrow directions indicated in FIGS. 5 to 7 in such a manner that the wheel rotational speed reaches the target value $V_{ref}(n+m)$ (=V8). In this case, the motor is driven at the rotational speed along the maximum efficiency curve shown in FIG. 5. Then, when the wheel rotational speed reaches the target value, the calculating means 21 of the wheel speed control means outputs the motor power $P_M(n+m)$ (=$P_M6$) shown in FIG. 5 due to the operation of the integral calculating means 212, whereas the unit 30 for generating the target motor rotational speed outputs a target motor rotational speed M (n+m). As a result, the wheel 100 is driven at the transmission gear ratio i(n+m) shown in FIG. 6, and also at the target wheel shaft rotational speed V(n+m) (=V8) shown in FIG. 7. In the characteristic graph of FIG. 5, a time instant (n+m) corresponds to a point of maximum efficiency. As previously explained, since the transmission gear ratio of the CVT 80 is variable in a forward direction based upon the target wheel rotational speed and the target motor rotational speed from the accelerator 10, the wheel rotational speed control with the dynamic speed response can be realized.

In FIG. 5 or FIG. 7, an amount of transition from the time instant (n) to the time instant (n+1) depends upon the proportional compensating constant "Kp" of the calculating circuit 21. The transient characteristic to the target wheel rotational speed may be controlled by varying the proportional compensating constant "Kp" and the control constant of the integral time constant "$T_V$". For instance, in FIG. 5, in case that the control constant is set to be smaller than the proportional compensating constant "Kp" defined in the equation (5) in FIG. 5, the motor power at the time instant (n+1) is smaller than $P_M10$, and then the vehicle is accelerated under such a condition that residual axial power of a difference between the wheel shaft power PV (n+1) and PV (n) shown in FIG. 7 is small. The value of the proportional compensating constant "Kp" and the integral time constant "$T_V$" may be arbitrarily changed by the calculating circuit 21.

In the above-described preferred embodiment, the calculating circuit 21 performs the proportional integral compensating control calculation. Alternatively, this calculating circuit 21 may execute the proportional integral/differential compensating (PID compensating) control calculation in which both of the control for transient and the differential compensation are carried out.

Although the above description has been made of the acceleration of the vehicle, the present invention may be similarly applied to a transient characteristic during a deceleration.

Figure 9:
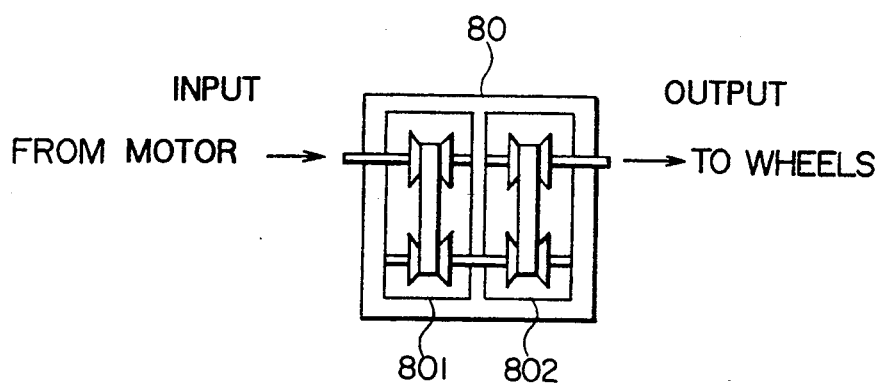
FIG. 9 schematically indicates an example for connecting two sets of CVTs.
Figure 10:
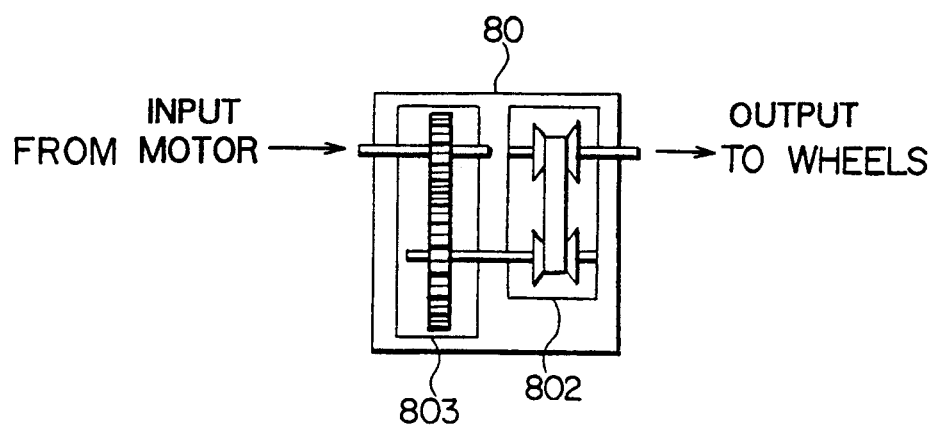
FIG. 10 schematically represents an example for connecting a CVT and a fixed transmission.

The number of transmission gear ratios "i" of the CVT 80 are finite. A ratio of the maximum value to the minimum value in the gear ratio is about 5 at this stage. If the transmission ratio, indicated by the calculating circuit 90 is not obtained from a single non-stage transmission, a multi-stage construction by connecting non-stage transmissions 801 and 802 shown in FIG. 9 is required. When either the minimum transmission gear ratio, or the maximum transmission gear ratio may be previously determined, a fixed transmission 803 is employed instead of the non-stage transmission 801 as shown in FIG. 10.

Figure 11:
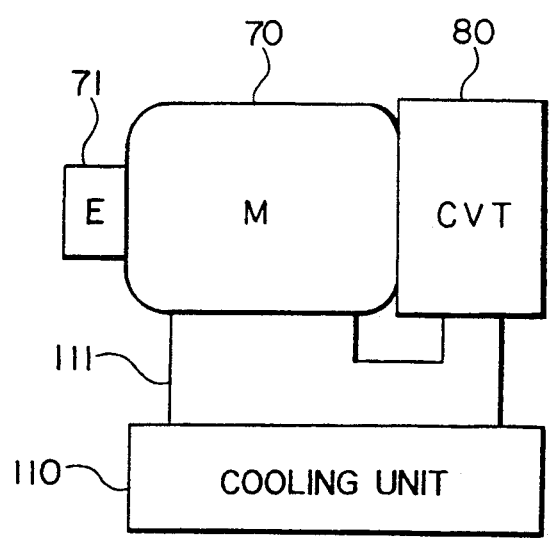
FIG. 11 schematically shows a construction in which both of a motor and a CVT are cooled by a common cooling system.

The motor 70 employed in the motor drive vehicle is constructed of a sealing structure so as to achieve water, dust proof protection, and is equipped with a cooling unit 110 for a heat protection, and a pipe 111 of this cooling unit 110 as shown in FIG. 11. Since the CVT 80 is also heated by receiving thermal energy produced by friction caused in the belts and the pulleys, the pulleys and the like must be cooled. Thus, as indicated in FIG. 11, the motor 70 and the CVT 80 are formed in an integral structure, or juxtaposed with the CVT 80, whereby the cooling unit 110 may be commonly utilized.

In the control apparatus of the motor drive vehicle shown in FIG. 1, according to the preferred embodiment of the present invention, the functions of the adder 20, the calculating circuit 21, the target motor speed generating unit 30, the adder 40, the calculating circuits 41 and 90 and the like may be realized by discrete electronic circuits, or by a general-purpose computer operable by a program.

The accelerator device 10 may be conceived by such an arrangement combining an accelerator pedal of a normal vehicle and a potentiometer, capable of outputting a depressed amount of the accelerator pedal as an electric signal. Alternatively, a device may be utilized by which a target vehicle speed (namely, wheel rotational speed) can be outputted as either an analog signal, or a digital signal. The rotational speed sensors 20 and 81 are commercially available. Since the drive unit 91 of the CVT 80 selects the transmission ratio in response to the instruction signal of the transmission ratio derived from the calculating circuit 90, this drive unit 91 corresponds to an actuator for driving the pulleys of the CVT 80.

In the above-described preferred embodiment, the combination between the inverter and the induction motor has been employed as the power circuit. Alternatively, a chopper and a DC motor may be combined with each other, or other different types of power circuits may be employed as this power circuit. Instead of the CVT 80, a transmission constructed by combining a plurality of gears which have different transmission gear ratios may be employed. Furthermore, according to the present invention, the battery has been used as the DC power source, and other power sources such as a solar cell and a fuel cell may be employed as this DC power source.

As previously described in detail, in the control apparatus of the motor drive vehicle according to the present invention, since the transmission gear ratio is varied in the forward direction by calculating the transmission gear ratio based upon the target wheel rotational speed related to the depressed amount of the accelerator device and the target motor rotational speed obtained from the maximum efficiency curves of the inverter and the motor, the motor drive vehicle can be driven at a high efficiency under high response characteristics. Moreover, the driving distance of the motor drive vehicle is extendable under a single recharging operation of a battery, as compared with that of the conventional motor drive vehicle.

Also, in the above-described drive unit of the present invention, the control constants in the rotational speed control calculation by the wheel rotational speed control means are controlled, so that since the acceleration/deceleration characteristics of the vehicle can be controlled under the high efficiency condition, the motor drive vehicle with the acceleration/deceleration characteristics suitable for any car drivers can be obtained.

If the calculated target transmission ratio is outside of the transmission ratios of a single transmission, a plurality of fixed transmissions and non-stage transmissions, or a plurality of non-step transmissions are connected in a cascade form. As a consequence, the motor drive vehicle can be driven with quick response characteristics at the high efficiency, and the drive distance thereof may be extended under a single recharging operation, as compared with that of the conventional motor drive vehicle.

Also, both of the motor and the non-stage transmission are formed in one body, and then the caviling medium is commonly used, so that the storage efficiency of the control apparatus may be increased.

What is claimed is:

1. A control apparatus of a vehicle driven by an electric motor, comprising:
    means for generating a target vehicle speed according to an operator input of an accelerator device;
    vehicle speed control means, having means for detecting actual speed of said vehicle and means for calculating difference between said target vehicle speed and the actual vehicle speed, for controlling a vehicle speed so as to make the difference zero;
    motor speed instruction means for receiving an instruction value corresponding to a value of said different and for generating a target motor speed according to a predetermined high efficiency pattern whereon maximum efficiency points are plotted in relation to the motor speed values and motor power values obtained from values of said difference;
    motor control means for receiving said target motor speed from said motor speed instruction means and driving said electric motor in said target motor speed;
    variable transmission means for receiving output of said electric motor and varying rotation speed of said output of the motor in a transmission ratio instructed so as to transfer the rotation to a drive shaft of said vehicle; and
    transmission ratio calculating means for determining said transmission ratio on the basis of said target vehicle speed and said target motor speed and instructing said transmission ratio to said variable transmission means.

2. A control apparatus as claimed in claim 1, wherein said variable transmission means includes a continuously variable transmission.

3. A control apparatus as claimed in claim 1, wherein said power circuit includes:
    means for detecting an actual motor output rotational speed;
    means for obtaining deviation between said target motor rotational speed and said motor output rotational speed; and
    a feedback loop for controlling said motor along such a direction that said deviation becomes zero.

4. A control apparatus as claimed in claim 1, wherein said power circuit includes an inverter in which a battery mounted on said motor drive vehicle is used as a power source.

5. A control apparatus as claimed in claim 1, wherein said transmission gear ratio calculating means includes:
    means for calculating a ratio of said target vehicle speed to said target motor rotation speed.

6. A control apparatus as claimed in claim 1, wherein said vehicle speed control means has a variable control constant of a transfer function thereof.

7. A control apparatus as claimed in claim 6, wherein said vehicle speed control means contains a proportional integral compensating control system, and both of a proportional compensating constant and an integral constant of a transfer function of said proportional integral compensating control system are variable.

8. A control apparatus as claimed in claim 1, wherein said variable transmission means is constructed by combining a plurality of continuously variable transmissions.

9. A control apparatus as claimed in claim 1, wherein said vehicle transmission means is constructed by combining a continuously variable transmission with a transmission having a fixed transmission ratio.

10. A control apparatus as claimed in claim 1, wherein said motor is juxtaposed with said transmission means, said motor drive vehicle further includes a cooling system, and both of said motor and said transmission means are commonly cooled by said cooling system.

11. A control apparatus as claimed in claim 4, wherein said motor is an induction motor driven by said inverter.

12. A method for controlling a vehicle driven by an electric motor, comprising the steps of:
  setting a target vehicle speed according to operation amount of an accelerator device;
  detecting actual speed of said vehicle;
  calculating difference between said target vehicle speed and the actual vehicle speed; and
  controlling a vehicle speed to make the difference zero, said vehicle speed controlling step further including the steps of:
  generating a target motor speed according to a predetermined high efficiency pattern whereon maximum efficiency points are plotted in relation to the motor speed values and motor power values obtained from values of said the difference;
  driving said electric motor in said target motor speed;
  determining a translation ratio on the basis of said target vehicle speed and said target motor speed; and
  varying rotation speed of said output of the motor in said transmission ratio so as to transfer the rotation to a drive shaft of said vehicle.

13. A control apparatus of a vehicle driven by an electric motor, comprising:
  a target vehicle speed generating unit providing a target vehicle speed according to an operator input of an accelerator device;
  vehicle speed control unit, having an actual speed detection unit and a difference calculating unit for calculating a difference between said target vehicle speed and the actual vehicle speed, for controlling a vehicle speed so as to make the difference zero;
  motor speed instruction device for receiving an instruction value corresponding to a value of said different and for generating a target motor speed according to a predetermined high efficiency pattern whereon maximum efficiency points are plotted in relation to the motor speed values and motor power values obtained from values of said difference;
  motor control unit for receiving said target motor speed from said motor speed instruction device and driving said electric motor in said target motor speed;
  a variable transmission for receiving output of said electric motor and varying rotation speed of said output of the motor in a transmission ratio instructed so as to transfer the rotation to a drive shaft of said vehicle; and
  transmission ratio calculating unit for determining said transmission ratio on the basis of said target vehicle speed and said target motor speed and instructing said transmission ratio to said variable transmission.

* * * * *